(12) United States Patent
Ree et al.

(10) Patent No.: US 8,823,330 B2
(45) Date of Patent: Sep. 2, 2014

(54) CHARGING SYSTEMS FOR USE WITH ELECTRIC VEHICLES AND METHODS OF MONITORING SAME

(75) Inventors: Bradley Richard Ree, Cumming, GA (US); John Christopher Boot, Sandy Springs, GA (US); George William Alexander, Marietta, GA (US)

(73) Assignee: General Electric Company, Schenectady, NY (US)

( * ) Notice: Subject to any disclaimer, the term of this patent is extended or adjusted under 35 U.S.C. 154(b) by 325 days.

(21) Appl. No.: 13/097,902

(22) Filed: Apr. 29, 2011

(65) Prior Publication Data

US 2012/0274287 A1 Nov. 1, 2012

(51) Int. Cl.
| | |
|---|---|
| *H02J 7/04* | (2006.01) |
| *H02J 7/14* | (2006.01) |
| *H02J 7/00* | (2006.01) |
| *B60L 11/18* | (2006.01) |
| *B60L 3/00* | (2006.01) |
| *B60L 3/04* | (2006.01) |

(52) U.S. Cl.
CPC ............ *B60L 11/1846* (2013.01); *Y02T 90/127* (2013.01); *B60L 2270/34* (2013.01); *B60L 2230/16* (2013.01); *Y02T 90/168* (2013.01); *B60L 2250/10* (2013.01); *Y02T 10/7088* (2013.01); *Y02T 10/7241* (2013.01); *Y02T 90/169* (2013.01); *Y02T 10/7005* (2013.01); *Y02T 90/163* (2013.01); *B60L 3/0046* (2013.01); *Y02T 90/128* (2013.01); *Y04S 30/14* (2013.01); *Y04S 30/12* (2013.01); *B60L 2210/30* (2013.01); *B60L 2270/32* (2013.01); *Y02T 90/14* (2013.01); *B60L 3/04* (2013.01); *B50L 2240/529* (2013.01)

USPC ............................ 320/162; 320/109; 320/104

(58) Field of Classification Search
USPC .......................................... 320/162, 109, 104
See application file for complete search history.

(56) References Cited

U.S. PATENT DOCUMENTS

| | | | | |
|---|---|---|---|---|
| 6,307,349 | B1 * | 10/2001 | Koenck et al. ................ | 320/112 |
| 6,833,784 | B1 * | 12/2004 | Ishii et al. .................. | 340/426.1 |
| 7,126,341 | B2 * | 10/2006 | Bertness et al. .............. | 324/426 |
| 8,072,184 | B2 * | 12/2011 | Bhade et al. .................. | 320/109 |
| 8,433,471 | B2 * | 4/2013 | Christensen et al. ........ | 701/29.1 |
| 2006/0220809 | A1 * | 10/2006 | Stigall et al. .................. | 340/438 |
| 2008/0238357 | A1 * | 10/2008 | Bourilkov et al. ............ | 320/106 |
| 2009/0234599 | A1 | 9/2009 | Watanabe | |
| 2009/0243564 | A1 * | 10/2009 | Kajita ........................... | 323/234 |
| 2009/0261786 | A1 * | 10/2009 | Hsu et al. ...................... | 320/162 |
| 2009/0313033 | A1 | 12/2009 | Hafner et al. | |
| 2009/0313034 | A1 | 12/2009 | Ferro et al. | |
| 2009/0313103 | A1 | 12/2009 | Ambrosio et al. | |
| 2009/0313104 | A1 | 12/2009 | Hafner et al. | |
| 2010/0010698 | A1 | 1/2010 | Iwashita et al. | |
| 2010/0045232 | A1 | 2/2010 | Chen et al. | |

(Continued)

*Primary Examiner* — M'Baye Diao
(74) *Attorney, Agent, or Firm* — Global Patent Operation; Stephen G. Midgley

(57) ABSTRACT

A system for monitoring operation of an electric vehicle charging station is provided. The system includes a battery charger configured to couple to a device for supplying current to the device, a current sensor coupled to the battery charger for measuring current supplied from the battery charger to the device, the current sensor configured to generate a measured current profile based on the measured current supplied to the device, and a processor coupled to the current sensor. The processor is configured to receive the measured current profile transmitted from the current sensor, and compare the measured current profile to at least one known current profile to monitor operation of the charging station.

18 Claims, 2 Drawing Sheets

(56) References Cited

U.S. PATENT DOCUMENTS

| | | |
|---|---|---|
| 2010/0138177 A1* | 6/2010 | Yu .................................... 702/63 |
| 2010/0145568 A1 | 6/2010 | Watanabe |
| 2010/0207588 A1 | 8/2010 | Lowenthal et al. |
| 2010/0211643 A1 | 8/2010 | Lowenthal et al. |
| 2010/0241542 A1* | 9/2010 | Pinkusevich et al. ........... 705/34 |
| 2010/0274570 A1* | 10/2010 | Proefke et al. ................. 705/1.1 |
| 2011/0068739 A1 | 3/2011 | Smith |
| 2011/0095723 A1* | 4/2011 | Bhade et al. ................... 320/109 |
| 2011/0221446 A1* | 9/2011 | Yount ........................... 324/434 |
| 2011/0248678 A1* | 10/2011 | Wade et al. ................... 320/119 |

\* cited by examiner

CHARGING SYSTEMS FOR USE WITH ELECTRIC VEHICLES AND METHODS OF MONITORING SAME

BACKGROUND OF THE INVENTION

The subject matter disclosed herein relates generally to electric vehicles, and more specifically, to charging stations used with electric vehicles.

In response to increasing fuel costs related to the use of conventional combustion engine vehicles, and in further response to heightened environmental concerns, including air pollution, the use of electric vehicles has increased. Known electric vehicles must be periodically recharged, and owners of such vehicles may use charging stations to replenish the charge stored in the batteries of their electric vehicle.

Charging stations can be located at the owner's residence, or at a commercial site. Energy purchases at some charging stations may be subsidized at least in part by government agencies and other entities, such that the cost to the consumer may be less than the cost of the same amount of energy would be otherwise if unsubsidized. However, at least some known charging stations are unable to differentiate between vehicles authorized to be connected to that particular charging station, and vehicles that are not so authorized. Further, at least some known charging stations are unable to detect malfunctions in authorized vehicles when the vehicles are connected to the charging station. Because of energy discounts, and such possible station limitations, individuals may be tempted to connect unauthorized devices to charging stations in an effort to steal energy for use in charging the unauthorized devices.

BRIEF DESCRIPTION OF THE INVENTION

In one aspect, a system for monitoring operation of an electric vehicle charging station is provided. The system includes a battery charger configured to couple to a device for supplying current to the device, a current sensor coupled to the battery charger for measuring current supplied from the battery charger to the device, the current sensor configured to generate a measured current profile based on the measured current supplied to the device, and a processor coupled to the current sensor. The processor is configured to receive the measured current profile transmitted from the current sensor, and compare the measured current profile to at least one known current profile to monitor operation of the charging station.

In another aspect, an electric vehicle charging station is provided. The electric vehicle charging station includes a connector configured to couple to a device, a battery charger configured to supply current to the device via the connector, a current sensor coupled to the battery charger for measuring current supplied from the battery charger to the device, the current sensor configured to generate a measured current profile based on the measured current supplied to the device, and a processor coupled to the current sensor. The processor is configured to receive the measured current profile transmitted from the current sensor, and compare the measured current profile to at least one known current profile to monitor operation of the charging station.

In yet another aspect, a method for monitoring operation of an electric vehicle charging station is provided. The method includes supplying current to a device using a battery charger, measuring the current supplied to the device, generating a measured current profile based on the measured current supplied to the device, transmitting the measured current profile to a processor, comparing, using the processor, the measured current profile to at least one known current profile, and monitoring operation of the charging station based on the comparison of the measured current profile to the at least one known current profile.

DETAILED DESCRIPTION OF THE INVENTION

The systems and methods described herein enable an unauthorized device to be identified when it is connected to an electric vehicle charging station. Further, the systems and methods described herein enable identification of a malfunctioning device connected to an electric vehicle charging station. Upon detection of an unauthorized and/or malfunctioning vehicle, the systems and methods described herein prevent additional charging of the device, transmit an alert signal to a network, and/or transmit a notification signal to a consumer.

Technical effects of the methods and systems described herein include at least one of: (a) supplying current to a device using a battery charger; (b) measuring the current supplied to the device; (c) generating a measured current profile based on the measured current supplied to the device; (d) transmitting the measured current profile to a processor; (e) comparing, using the processor, the measured current profile to at least one known current profile; and (f) monitoring operation of the charging station based on the comparison of the measured current profile to the at least one known current profile.

As used herein, an electric vehicle is defined as any vehicle that includes one or more electric motors used for propulsion. Energy used to propel electric vehicles may come from various sources, such as, but not limited to, an on-board rechargeable battery and/or an on-board fuel cell. In one embodiment, the electric vehicle is a hybrid electric vehicle, which captures and stores energy generated, for example, from braking. Moreover, a hybrid electric vehicle uses energy stored in an electrical source, such as a battery, to continue operating when idling to conserve fuel. Some hybrid electric vehicles are capable of recharging the battery by plugging into a power receptacle, such as a power outlet. Accordingly, the term "electric vehicle" as used herein may refer to a hybrid electric vehicle or any other vehicle that receives electrical energy.

Figure 1:
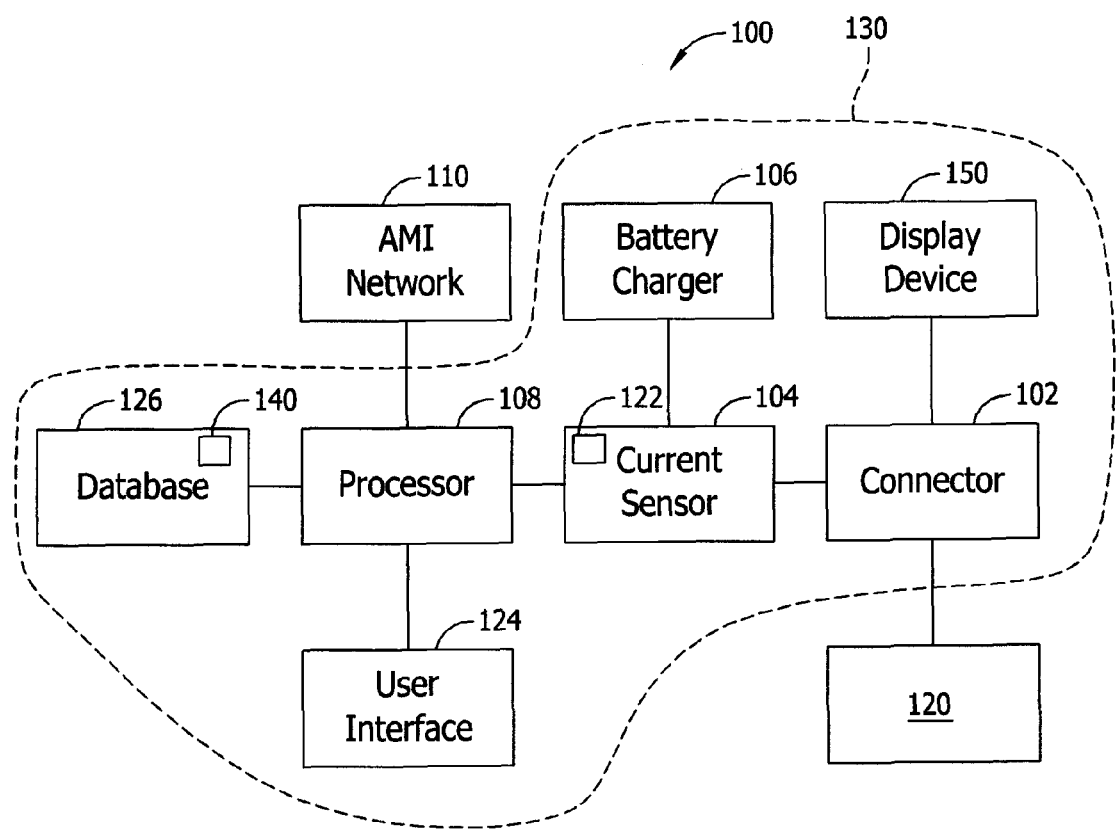
FIG. 1 is a block diagram of an exemplary system for use in charging vehicles.

FIG. 1 is a block diagram of an exemplary system 100 that may be used to charge an electric vehicle. In the exemplary embodiment, system 100 includes a connector 102, a current sensor 104, a battery charger 106, a processor 108, and a network 110. Connector 102 couples to a device 120 to enable charging. Battery charger 106 supplies current to device 120. In the exemplary embodiment, network 110 is controlled and/or supplied by an operator of charging station 130, such as, for example, a utility provider. Alternatively, network 110 may be operated by any entity that enables system 100 to function as described herein.

Current sensor 104 is coupled between battery charger 106 and connector 102 to monitor current supplied from battery charger 106 to device 120. Coupling sensor 104 to monitor the current supplied from battery charger 106 enables system 100 to identify a device 120 coupled to connector 102 and an operational state of device 120, as described in more detail below. In the exemplary embodiment, current sensor 104 is a shunt resistor. Alternatively, current sensor 104 may be a Rogowski coil, a current transformer, and/or any other device that enables system 100 to function as described herein.

Processor 108 is coupled to current sensor 104 to enable communication between processor 108 and current sensor 104. More specifically, current sensor 104 generates and transmits a measured current profile 122 to processor 108 for processing, as is described herein. In the exemplary embodiment, measured current profile 122 is indicative of a rate of current supplied by battery charger 106 to device 120. Alternatively, measured current profile 122 may include any information that enables system 100 to function as described herein, such as, but not limited to, information relating to a total amount of current supplied to device 120 and/or a duration of time needed to charge device 120.

In the exemplary embodiment, processor 108 is coupled to network 110, a user interface 124, and a database 126. User interface 124 may include, for example, a keyboard, a display device, a pointing device, a mouse, a stylus, a touch sensitive panel, a touch pad, a touch screen, a gyroscope, an accelerometer, a position detector, and/or an audio user input interface. In the exemplary embodiment, processor 108 is also coupled to battery charger 106, such that processor 108 can terminate operation of battery charger 106, as described in detail herein.

Connector 102, current sensor 104, battery charger 106, processor 108, and database 126 may all be located within a charging station 130 used to charge a battery within an electric vehicle. Alternatively, connector 102, current sensor 104, battery charger 106, processor 108, and/or database 126 may be located remotely from one another. Further, device 120 may include a vehicle authorized for use with charging station, a vehicle unauthorized for use with charging station, and/or a non-vehicular device unauthorized for use with charging station, such as an appliance and/or any other electrical device. System 100 determines whether device is an authorized vehicle, an unauthorized vehicle, and/or an unauthorized non-vehicular device, as described in more detail below.

At least one known current profile 140 is stored in database 126. Such a current profile 140 may be indicative of, for example, a rate of current supplied to a known device, a total amount of current supplied to a known device, and/or a duration of time needed to charge a known device. Database 126 is communicatively coupled to processor 108 such that processor 108 can retrieve the known current profile 140 from database 126. Moreover, database 126 may store the known current profile 140 of a known authorized device, a known malfunctioning device, and/or a known unauthorized device.

In one embodiment, the known current profile 140 is downloaded into database 126 from network 110. Alternatively, the known current profile 140 may be input into database 126 via a user operating user interface 124. In yet another embodiment, at least one previously measured current profile 122 may be stored in database 126 for future use as known current profile 140.

Processer 108, in the exemplary embodiment, analyzes the measured current profile 122 by comparing the measured current profile 122 to known current profiles 140 stored within database 126. When more than one known current profile 140 is stored within database 126, known current profiles 140 may be organized by information, such as, but not limited to, vehicle make, vehicle model, vehicle year, and/or vehicle battery type. Alternatively known current profiles 140 may be organized by any categorization that enables system 100 to function as described herein. To analyze measured current profile 122, processor 108 compares measured current profile 122 to at least one known current profile 140. In the exemplary embodiment, processor 108 compares measured current profile 122 to all known current profiles 140 stored in database 126. Alternatively, processor 108 may compare measured current profile 122 to only a portion of known current profiles 140 stored in database and/or selects which stored current profiles 140 should be used to compare to the measured current profile 122. In one embodiment, a consumer using charging station 130 and/or a user operating user interface 124 may input information indicating which known current profiles 140 should to be compared to the measured current profile 122. Such information may include, but is not limited to only including, vehicle make, vehicle model, vehicle year, and/or vehicle battery type.

When comparing the measured current profile 122 to known current profiles 140, processor 108 may determine that the measured current profile 122 does not match any of the stored known current profiles 140 associated with vehicles authorized to use charging station 130. For example, a consumer may attempt to connect an unauthorized device to connector 102, such as a non-vehicular device. If a measured current profile 122 does not match a known current profile 140, stored in database 126, while battery charger 106 supplies current to device 120, processor may determine that device 120 is an unauthorized device.

Processor 108 may also determine that an authorized device coupled to connector 102 is malfunctioning by determining that the measured current profile 122 matches known current profile 140 associated with an authorized, but malfunctioning device. Such a malfunction may include, for example, an electrical short in device 120, a failing battery in device 120, and/or one or more damaged electrical connections in device 120. Notably, processor may identify any malfunction caused by a condition of device 120 that is detectable by comparing the measured current profile to known current profiles 140.

In the exemplary embodiment, processor 108 determines whether the measured current profile 122 is within a predetermined tolerance as compared to known current profiles 140 stored in database 126. That is, the measured current profile 122 need not exactly match one of known current profiles 140 in order for processor 108 to determine that the measured current profile 122 matches one of known current profiles 140. Alternatively, processor 108 may determine whether the measured current profile 122 matches the known current profiles 140 using any suitable parameters that enable system 100 to function as described herein.

When processor 108 detects the connection of an unauthorized and/or malfunctioning device 120 to connector 102, in the exemplary embodiment, processor 108 causes battery charger 106 to immediately cease charging device 120. In another embodiment, when processor 108 detects the connection of an unauthorized and/or malfunctioning device 120, processor 108 generates and transmits an alert signal to network 110, notifying network 110 of an unauthorized and/or malfunctioning device 120. In yet another embodiment, when processor 108 detects the connection of an unauthorized and/or malfunctioning device 120, processor 108 generates and transmits a notification signal to a display device 150 coupled to connector 102, to notify a consumer operating charging station 130 of an unauthorized and/or malfunctioning device 120. Display device 150 may include, for example, a cathode ray tube (CRT), a liquid crystal display (LCD), an organic light emitting diode (OLED) display, and/or an "electronic ink" display. In such an embodiment, the notification signal enables information associated with the particular malfunction to be displayed on display device 150, such that a consumer is informed of the malfunction.

Figure 2:
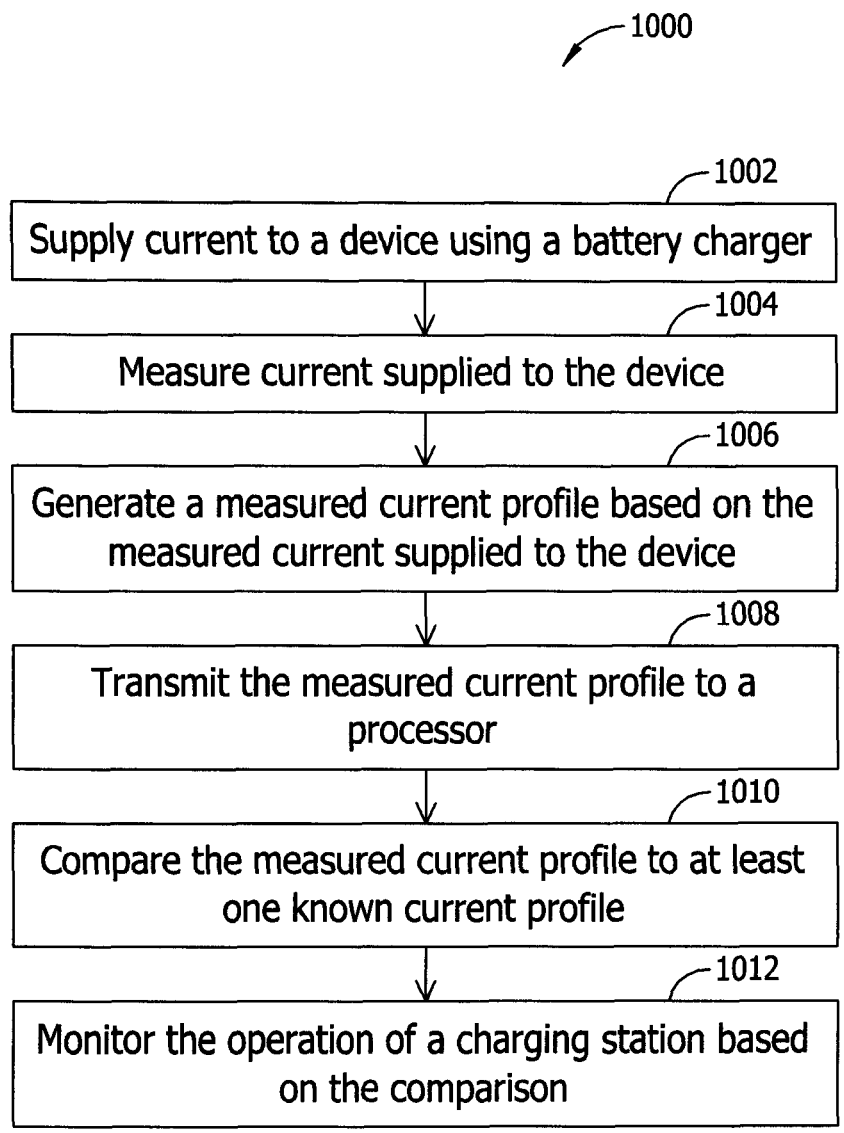
FIG. 2 is a flow chart of an exemplary method for use in monitoring operation of a charging station used with electric vehicles.

FIG. 2 is a flow chart of an exemplary method 1000 that may be used for monitoring operation of a charging station, such as, for example, charging station 130 (shown in FIG. 1). In the exemplary embodiment, current is supplied 1002 to a device, such as device 120 (shown in FIG. 1) using, for example, battery charger 106 (shown in FIG. 1). The current supplied to the device is measured 1004, for example, by current sensor 104 (shown in FIG. 1). A measured current profile, such as, for example, measured current profile 122 (shown in FIG. 1), is generated 1006 based on the measured current supplied to the device. The measured current profile is transmitted 1008 to a processor, such as, for example, processor 108 (shown in FIG. 1). The processor compares 1010 the measured current profile to at least one known current profile, such as, for example, known current profile 140 (shown in FIG. 1). Based on the comparison of the measured current profile to the known current profile, the operation of the charging station is monitored 1012. Monitoring 1012 the operation of the charging station may include, for example, determining whether the device is authorized, unauthorized, and/or malfunctioning.

As compared to known charging station systems and methods, the systems and methods described herein enable the connection of unauthorized devices to a charging station to be identified by comparing a measured current profile to known current profiles. Further, in contrast to known charging stations, the systems and methods described herein enable malfunctions within a vehicle connected to a charging station to be identified by comparing a measured current profile to known current profiles. After determining that an unauthorized device is connected to the charging station, or that a connected vehicle has a malfunction, a notification and/or alert is generated and further charging using the charging station is inhibited.

The systems and methods described herein facilitate identifying when an unauthorized device is connected to an electric vehicle charging station. Further, the systems and methods described herein facilitate identifying when a malfunctioning device is connected to an electric vehicle charging station. Upon detection of an unauthorized and/or malfunctioning vehicle, the systems and methods described herein may inhibit further charging of the device, send an alert signal to a network, or send a notification signal to a consumer.

Exemplary embodiments of systems and methods for electric vehicle charging stations described above in detail. The systems and methods described herein are not limited to the specific embodiments described herein, but rather, components of the systems and/or steps of the methods may be utilized independently and separately from other components and/or steps described herein. For example, the methods and systems described herein may have other applications not limited to practice with electric vehicle charging stations, as described herein. Rather, the methods and systems described herein can be implemented and utilized in connection with various other industries.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system for monitoring operation of an electric vehicle charging station, said system comprising:
   a battery charger configured to couple to a device for supplying current to the device;
   a current sensor coupled to said battery charger for measuring current supplied from said battery charger to the device, said current sensor configured to generate a measured current profile based on the measured current supplied to the device; and
   a processor coupled to said current sensor, said processor configured to:
      receive the measured current profile transmitted from said current sensor;
      compare the measured current profile to at least one known current profile to monitor operation of the charging station; and
      determine whether the device is at least one of an unauthorized device and a malfunctioning device based on the result of the comparison.

2. A system in accordance with claim 1, further comprising a database configured to store the at least one known current profile, said processor in communication with said database such that said processor is further configured to selectively retrieve the at least one known current profile from said database.

3. A system in accordance with claim 2, further comprising a user interface coupled to said processor, said user interface enables a user to input at least one known current profile into said database.

4. A system in accordance with claim 2, further comprising a network coupled to said processor, said database configured to download at least one known current profile from said network.

5. A system in accordance with claim 1, wherein said processor is further configured to compare the measured current profile to the at least one known current profile to determine whether the device is authorized for use with the charging station.

6. A system in accordance with claim 5, wherein said processor is further configured to generate and transmit an alert signal when said processor determines the device is unauthorized.

7. A system in accordance with claim 5, wherein said processor is further configured to prevent said battery charger from charging the device when said processor determines the device is unauthorized.

8. A system in accordance with claim 1, wherein said processor is further configured to compare the measured current profile to the at least one known current profile to determine whether the device coupled to said battery charger is malfunctioning.

9. A system in accordance with claim 8, wherein said processor is further configured to generate and transmit a notification when said processor determines the device is malfunctioning.

10. A system in accordance with claim 1, wherein said current sensor measures a rate of current supplied from said battery charger to the device, the measured current profile including the rate of current.

11. An electric vehicle charging station comprising:
a connector configured to couple to a device;
a battery charger configured to supply current the device via said connector a current sensor coupled to said battery charger for measuring current supplied from said battery charger to the device, said current sensor configured to generate a measured current profile based on the measured current supplied, to the device; and
a processor coupled to said current sensor, said processor configured to:
receive the measured current profile transmitted from said current sensor;
compare the measured current profile to at least one known current profile to monitor operation of said charging station, and
determine whether the device is at least one of an unauthorized vehicle, a non-vehicular device, and a malfunctioning device based on the results of the comparison.

12. A charging station in accordance with claim 11, wherein said processor is further configured to prevent said battery charger from supplying current to the device when said processor determines the device is at least one of an unauthorized vehicle, a non-vehicular device, and a malfunctioning device.

13. A charging station in accordance with claim 11, further comprising a display device, said processor further configured to generate and transmit a notification to said display device when said processor determines the device is malfunctioning.

14. A charging station in accordance with claim 11, wherein said current sensor measures a rate of current supplied from said battery charger to the device, the measured current profile including the rate of current.

15. A method for monitoring operation of an electric vehicle charging station, said method comprising:
supplying current to a device using a battery charger;
measuring the current supplied to the device;
generating a measured current profile based on the measured current supplied to the device;
transmitting the measured current profile to a processor;
comparing, using the processor, the measured current profile to at least one known current profile;
monitoring operation of the charging station based on the comparison of the measured current profile to the at least one known current profile; and
determining, using the processor, whether the device is at least one of unauthorized and malfunctioning based on the results of the comparison.

16. A method in accordance with claim 15, further comprising inhibiting the battery charger from supplying current to the device when the processor determines the device is at least one of unauthorized and malfunctioning.

17. A method in accordance with claim 15, further comprising:
generating a notification when the processor determines the device is unauthorized; and
transmitting the notification to a network coupled to the processor.

18. A method in accordance with claim 15, further comprising:
generating a notification when the processor determines the device is malfunctioning; and
transmitting the notification to a display device.

* * * * *

UNITED STATES PATENT AND TRADEMARK OFFICE
CERTIFICATE OF CORRECTION

PATENT NO. : 8,823,330 B2  
APPLICATION NO. : 13/097902  
DATED : September 2, 2014  
INVENTOR(S) : Ree et al.

Page 1 of 1

It is certified that error appears in the above-identified patent and that said Letters Patent is hereby corrected as shown below:

In the claims

In Column 7, Line 7, in Claim 11, delete "current the" and insert -- current to the --, therefor.

In Column 7, Line 8, in Claim 11, delete "connector a current sensor.................. to the device; and" and
insert -- connector;
a current sensor coupled to said battery charger for measuring current supplied from said battery charger to the device, said current sensor configured to generate a measured current profile based on the measured current supplied, to the device; and --, therefor.

In Column 7, Line 12, in Claim 11, delete "supplied," and insert -- supplied --, therefor.

Signed and Sealed this
Twelfth Day of May, 2015

Michelle K. Lee
*Director of the United States Patent and Trademark Office*